(12) United States Patent
Beasley

(10) Patent No.: US 7,095,909 B1
(45) Date of Patent: Aug. 22, 2006

(54) LIGHT PEN SYSTEM AND METHOD

(76) Inventor: Bruce Beasley, 13070 Oak Rd., Felton, CA (US) 95018

( * ) Notice: Subject to any disclaimer, the term of this patent is extended or adjusted under 35 U.S.C. 154(b) by 0 days.

(21) Appl. No.: 07/636,839

(22) Filed: Jan. 2, 1991

(51) Int. Cl.
G06K 9/22 (2006.01)
(52) U.S. Cl. .................... 382/314; 345/180; 178/18.01
(58) Field of Classification Search ............... 340/707, 340/712, 706; 178/18, 19
See application file for complete search history.

(56) References Cited

U.S. PATENT DOCUMENTS 3,832,485 A * 8/1974 Pieters ..................... 340/707
3,973,245 A * 8/1976 Belser ...................... 345/180
3,997,891 A * 12/1976 Iwamura et al. ........... 340/707
4,017,680 A * 4/1977 Anderson et al. .......... 340/707
4,254,416 A * 3/1981 Lelke ....................... 345/472
4,672,683 A * 6/1987 Matsueda .................. 340/707
4,847,604 A * 7/1989 Doyle ....................... 345/180

\* cited by examiner

Primary Examiner—Brian Werner
(74) Attorney, Agent, or Firm—Edward S. Wright

(57) ABSTRACT

System and method for forming an operator controlled image on a video display screen with a light sensing pen. The pen is moved relative to the screen to provide a signal corresponding to the position of the pen during each successive frame of the display. A memory having a plurality of data storage locations corresponding to different points on the screen is scanned in synchronization with the position of the beam, and data is written into the memory in response to the signal from the light pen at locations corresponding to the points at which the light pen senses the bean during successive frames. This data is read out of the memory as it is scanned and is utilized to produce an image corresponding to the position of the light pen in successive frame.

4 Claims, 2 Drawing Sheets

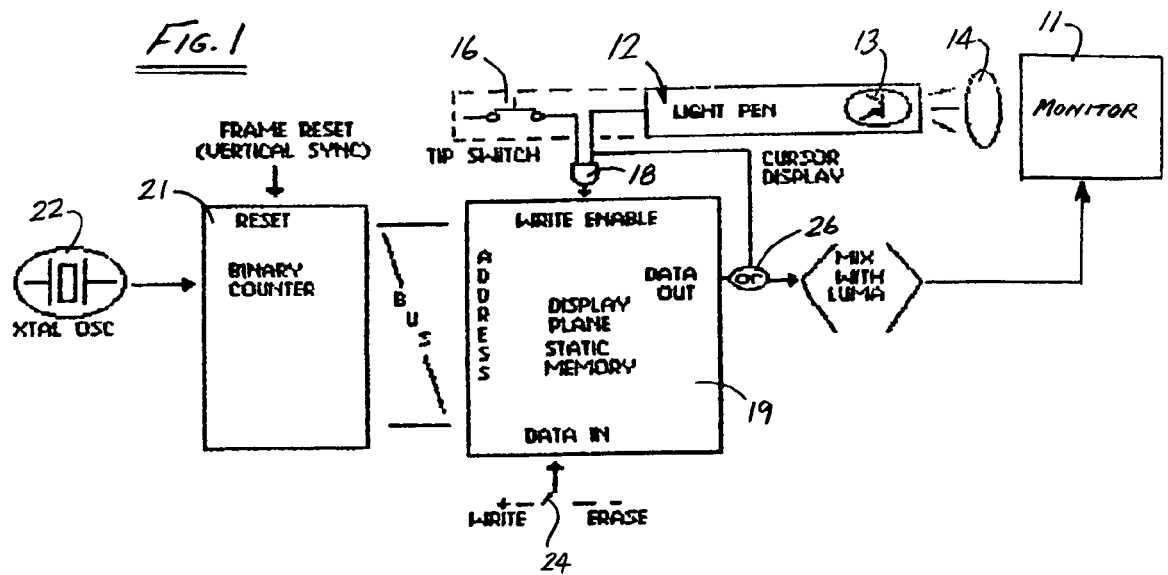
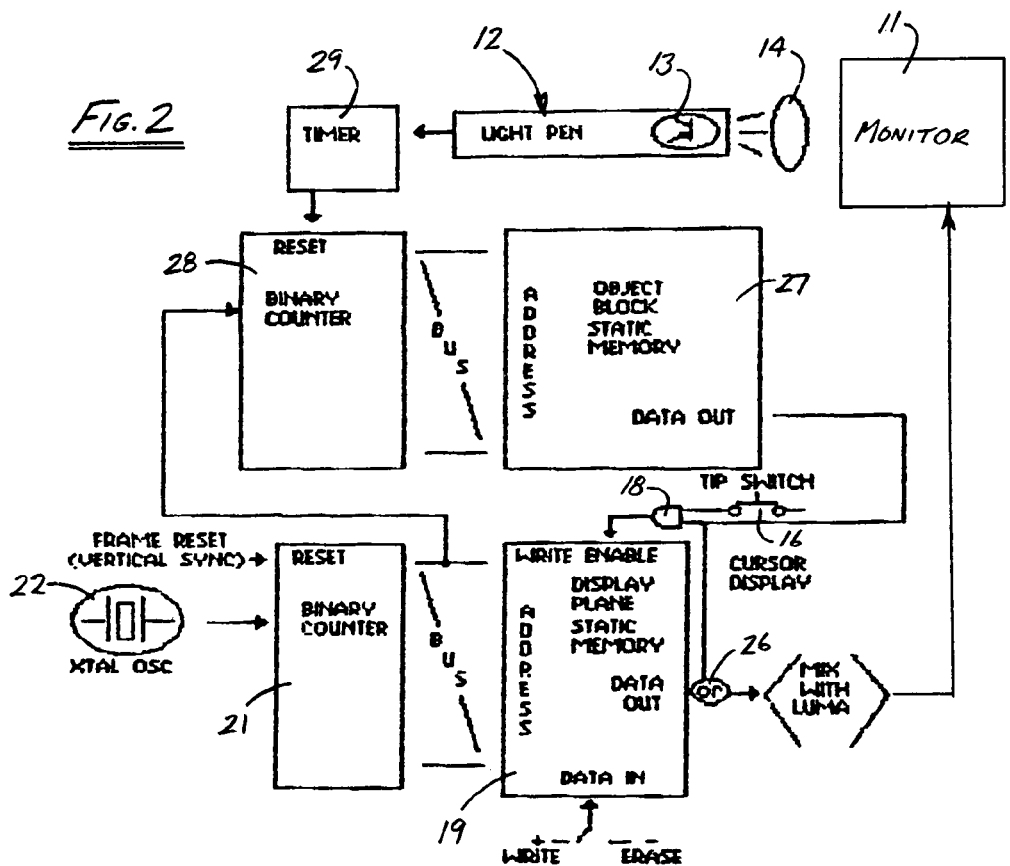

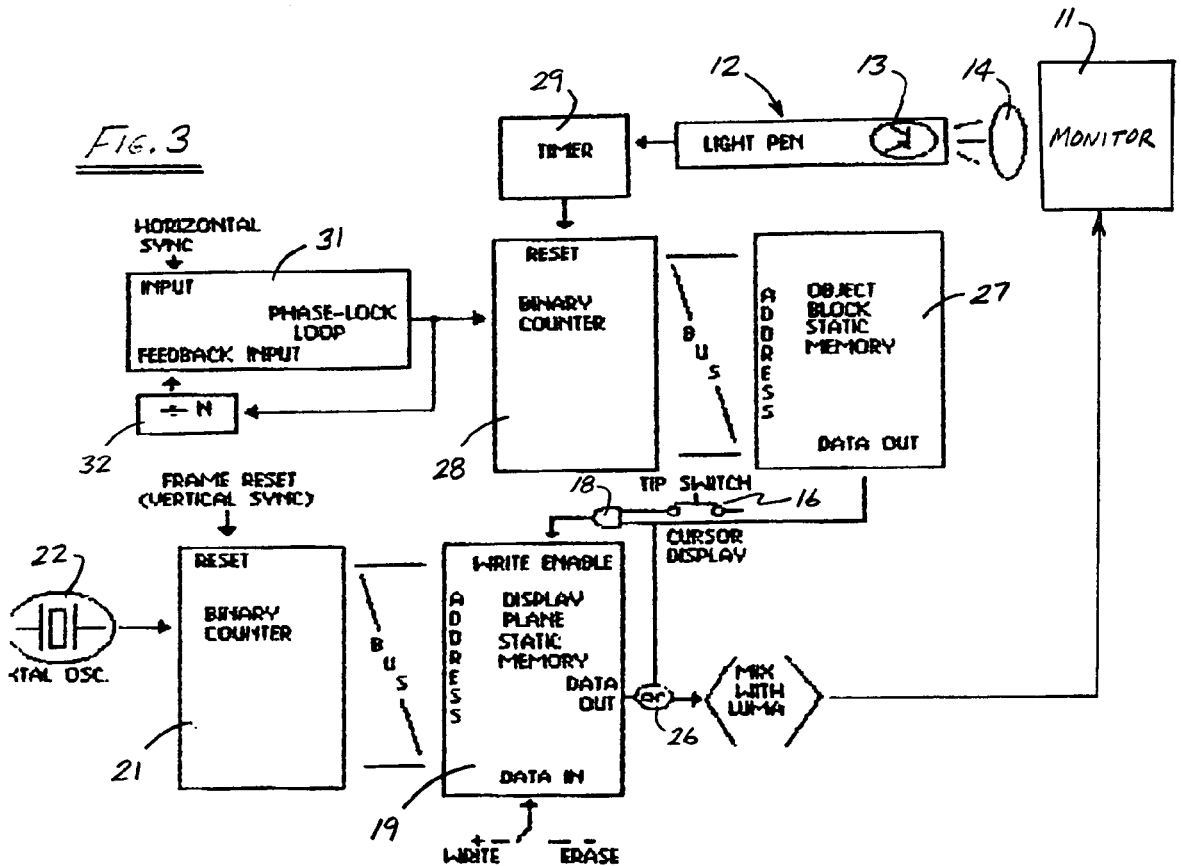

LIGHT PEN SYSTEM AND METHOD

This invention pertains generally to video displays and, more particularly, to a system and method for displaying an operator controlled cursor on a video display screen.

Video displays are used widely with computers and in other applications. Such displays typically include a cathode ray tube with a phosphorescent screen on which images are formed by an electron beam scanning the screen in raster fashion. In some applications, it is desirable for the person using the computer or display to be able to point to or otherwise indicate certain portions of the information on the display.

One application in which the ability to point to or otherwise indicate information on a video display is particularly desirable is in a classroom where the information displayed on a video monitor is projected by a video data projector so that it can be viewed by a number of students.

Heretofore, a number of so-called "light pens" have been provided for use in different applications. These devices generally have a light sensor which, when held near the screen of a cathode ray tube, delivers a signal as the beam sweeps past the point at which the sensor is positioned, thereby providing a signal corresponding to the position of the pen on the screen. One example of a system utilizing such a device for delineating a portion of the information on a video display is found in U.S. Pat. No. 3,832,485, where a word corresponding to the horizontal and vertical coordinates of the pen position is stored and then processed to provide an image of a path traced by the pen. This system is relatively complex and expensive and is not readily suitable for use with video data projectors.

It is in general an object of the invention to provide a new and improved light pen system and method.

Another object of the invention is to provide a light pen system and method of the above character which are particularly suitable for use with video data projectors.

Another object of the invention is to provide a light pen system and method of the above character which can be implemented economically.

These and other objects are achieved in accordance with the invention by moving a light sensing pen relative to a video display screen, providing a signal from the light pen when the light pen senses the beam during each successive frame of the display, sequentially addressing the data storage locations of an addressable memory in synchronization with the position of the beam so that the memory locations correspond to different points on the screen, writing data into the memory in response to the signal from the light pen at locations corresponding to the points at which the light pen senses the beam during successive frames, reading the data out of the memory locations as they are addressed, and in response to the data read out of the memory producing an image corresponding the points where the light pen is positioned during successive frames.

FIG. 1 is a block diagram of one embodiment of a light pen system according to the invention.

FIG. 2 is a block diagram of another embodiment of a light pen system according to the invention.

FIG. 3 is a block diagram of another embodiment of a light pen system according to the invention.

In FIG. 1, the invention is illustrated in connection with a video monitor 11, which can be either a monochromatic monitor or a polychromatic (color) monitor of conventional design. The monitor has a phosphorescent screen which is scanned in successive frames in raster fashion by an electron beam which is modulated in intensity in accordance with the image to be formed on the screen.

The system includes a light pen 12 comprising a light sensing element 13 such as a photodetector and a lens 14 for focusing light from a limited portion of the display screen onto the sensing element. When the scanning beam travels across the portion of the screen within the field of view of the lens, the sensing element detects the light produced by the beam and produces an output signal. As will become more apparent as the rest of the system is described, the size of the spot or the width of the line drawn by the light pen is in part dependent upon the field of view of the lens and can be made larger or smaller by increasing or decreasing the field.

The light pen also includes a tip switch 16 which in one embodiment is actuated or closed by pressing the tip of the pen against the screen of the display when it is desired to write with the light pen. A similar function can be provided with a switch which is manually closed by the operator if it is preferred not to touch the display screen with the pen.

The signals from the sensing element and the tip switch of the light pen are applied to the inputs of an AND gate 18, and the output of this gate is applied to the WRITE ENABLE input of a memory 19 which has a plurality of individually addressable data storage cells or locations. The two signals are thus gated together to apply a WRITE ENABLE signal to the memory when the switch is closed and the position of the light pen coincides with that of the beam on the screen of the display.

Means is provided for scanning the memory locations in synchronization with the beam of the display so that each of the memory locations corresponds to a different point on the screen of the display. This means includes a binary counter 21, the outputs of which are connected to the address inputs of the memory, and a crystal controlled oscillator 22 connected to the clock input of the counter. The vertical sync signal from the monitor is applied to the RESET input of the counter to reset the counter to zero at the outset of each frame of the picture.

In one presently preferred embodiment, the display is scanned at a rate of 30 frames per second, the memory has a capacity of 256 K bits, and the clock operates at a frequency of 25 MHz, which is divided down to provide a four phase machine cycle in which the memory is actually addressed at a rate of about 2 MHz. It will be understood, however, that any suitable memorize size and clock rate can be employed, with larger memories and higher clock rates providing greater resolution in the image which is written.

A signal is applied to the data input of the memory to determine whether data is written into or erased from the different locations of the memory as they are addressed. This signal is provided by a switch 24 which can be selectively positioned apply positive or negative voltages to the data input. The positive voltage corresponds to a "write" signal and causes a logic 1 to be written into the cell which is addressed. The negative voltage corresponds to an "erase" signal and causes a logic 0 to be written. The memory can be cleared by simultaneously applying a WRITE ENABLE signal and applying a negative voltage to the data input to cause zeros to be written into all cells as they are addressed.

Data is read continuously out of the memory and mixed with the luma or video signal which is applied to the display monitor. Thus, in the embodiment of FIG. 1, the data output of the memory is applied to one input of an OR gate 26, and the sensor signal from the light pen is applied to a second input of this gate. The output of the OR gate is mixed with the luma or video signal and applied to the monitor to control the intensity of the scanning beam so that the image created by the light pen is in effect superimposed on the primary or source image displayed by the monitor.

The output of OR gate 26 can also be applied to the input of a video data processor or other suitable equipment to cause the superimposed images to be projected or otherwise displayed for viewing at a location remote from the monitor.

Operation and use of the embodiment of FIG. 1, and therein the method of the invention, are as follows. Initially, the memory is cleared by writing all zeros into it, and a primary or source image is displayed. To draw a line on the display, the light pen is pointed at the screen and moved along the path where the line is to be drawn. During each frame of the picture, the position of the light pen is detected by the light impinging upon the sensing element from the portion of the screen within the field of view of the pen, and the signal from the light pen is stored at the memory location(s) corresponding to the point(s) on the screen within the field. The data stored during successive frames thus represents the position of the light pen during those frames, i.e. the path traced by the pen.

The stored data is read continuously out of the memory when the system is in the WRITE mode, i.e. when the positive voltage is applied to the data input. As the data is read out of the memory, it is combined with the luma or video signal containing the information for the primary or source image, and the combined signal is applied to the monitor and/or a video data projector or other suitable device to provide the superimposed images.

All or part of the cursor image can be erased by applying a negative voltage to the data input and moving the light pen along the portion of the image to be erased.

The embodiment of FIG. 2 is similar to the embodiment of FIG. 1 and in addition includes means for providing a light pen image of any desired shape and size. This means includes an object memory 27 which is programmed with data defining an object to be controlled by the light pen. This object might, for example, be a circle, a rectangle, a pointing finger, or an arrow. This memory can be of any desired size and can, for example, be the same size as the main memory which is labelled "display plane" in the drawings.

Means is provided for reading the data out of the object memory in synchronization with the scanning of the beam on the screen of the display. This means includes a binary counter 28, the outputs of which are connected to the address inputs of the object memory. The clock signal for object memory counter is provided by the low order bit from the display plane memory counter 21, and the object memory counter is reset by a timing signal derived from the light pen sensor. This signal is derived by applying the signal from the light pen sensor to the input of a timer 29, the output of which is connected to the RESET input of the object memory counter. The counter advances only when the output signal from the timer is present, and the height of the light pen image is thus dependent upon the period of the timer.

The data output of the object block memory is applied to the inputs of AND gate 18 and OR gate 26 in place of the output of the light pen sensor.

Operation and use of the embodiment of FIG. 2 are similar to that of the embodiment of FIG. 1. In the embodiment of FIG. 2, however, instead of being stored directly in display plane memory 19, the signal from light pen sensor 13 triggers timer 29, which causes the data in object memory 27 to be written into the display plane memory at the locations dictated by the position of the light pen. As this data is read out of memory 19, it causes an image of the object defined by the data to be displayed on the screen in the location where the light pen is pointed.

The embodiment of FIG. 3 is similar to the embodiment of FIG. 2 except for the manner in which the clock signal is applied to the object memory counter 28. In this embodiment, the clock signal is derived from the horizontal sync signal of the display monitor by means of a phase-lock loop 31. The horizontal sync signal is applied to the input of the phase-lock loop, and the output of the loop is connected to the clock input of the counter, with a divide-by-N counter 32 connected between the output and the feedback input of the loop, were N is the width of the light pen object in bits. In this embodiment, the height of the object is determined by the period of the timer 29, and the width of the object is determined by the value of N.

Operation and use of the embodiment of FIG. 3 are similar to that of the embodiment of FIG. 2, with the data being read out of the object memory in accordance with the signal derived from the horizontal scan rate.

The invention has a number of important features and advantages. It provides a high degree of flexibility and control over the position, shape and size of a cursor image which can be superimposed on a primary or source image on a video display, and it can be constructed economically from standard components which are readily available.

It is apparent from the foregoing that a new and improved light pen system and method have been provided. While only certain presently preferred embodiments have been described in detail, as will be apparent to those familiar with the art, certain changes and modifications can be made without departing from the scope of the invention as defined by the following claims.

The invention claimed is:

1. A system for forming an image on a display screen scanned in frames by a beam, comprising:
    a light pen which can be pointed at different points on the screen and has a light sensing element for providing a signal when the position of the light pen coincides with the position of the beam,
    a display memory having a plurality of addressable storage locations,
    an object memory containing data for an object to be controlled by the light pen,
    means responsive to the signal from the light pen for reading data out of the object memory in synchronism with the scanning of the beam,
    means for writing the data read out of the object memory into the display memory at locations corresponding to the position of the light pen on the screen during successive frames,
    means for addressing the display memory locations,
    means for reading the data out of the display memory locations as they are addressed, and
    means responsive to the data read out of the display memory for producing an image of the object on the screen at points where the light pen is pointed during successive frames.

2. The system of claim 1 wherein the means for writing data into the display memory comprises a counter connected to address inputs of the display memory, means for applying clock signals to the counter at a predetermined rate, and means for resetting the counter to a predetermined count at a predetermined location in each frame of the display.

3. A method of forming an image on a display screen scanned in frames by a beam, comprising the steps of:
    pointing a light sensing pen at different points on the screen, providing a signal from the light pen when the light pen senses the beam during each successive frame, storing data for an object to be displayed on the screen in an object memory, reading data out of the object memory in response to the signals from the light pen and in synchronism with the scanning of the beam, writing the data read out of the object memory into a display memory at locations corresponding to the points at which the light pen senses the beam during successive frames, addressing the display memory locations, reading the data out of the display memory locations as they are addressed, and producing an image of the object on the screen in response to the data read out of the display memory at the points where the light pen senses the beam during successive frames.

4. The method of claim 3 wherein the display memory locations are addressed sequentially by applying clock signals to a counter connected to the address inputs of the display memory, and resetting the counter to a predetermined count at a predetermined point in each frame of the display.

* * * * *

UNITED STATES PATENT AND TRADEMARK OFFICE
CERTIFICATE OF CORRECTION

PATENT NO. : 7,095,909 B1  Page 1 of 1
APPLICATION NO. : 07/636839
DATED : August 22, 2006
INVENTOR(S) : Beasley It is certified that error appears in the above-identified patent and that said Letters Patent is hereby corrected as shown below:

Insert:  On the cover page,

--[*] Notice:   This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 USC 154(b) by 1647 days.--

Signed and Sealed this

Twentieth Day of April, 2010

David J. Kappos
*Director of the United States Patent and Trademark Office*